(12) United States Patent
Blake

(10) Patent No.: US 7,478,864 B2
(45) Date of Patent: Jan. 20, 2009

(54) METHOD AND APPARATUS TO IMPROVE STABILITY OF AUTOMOBILE

(76) Inventor: Scott A. Blake, 30239 N. 164th St., Scottsdale, AZ (US) 85262

( * ) Notice: Subject to any disclaimer, the term of this patent is extended or adjusted under 35 U.S.C. 154(b) by 0 days.

(21) Appl. No.: 11/789,319

(22) Filed: Apr. 24, 2007

(65) Prior Publication Data
US 2008/0265619 A1 Oct. 30, 2008

(51) Int. Cl.
*B60J 1/00* (2006.01)
(52) U.S. Cl. .................................................. 296/180.1
(58) Field of Classification Search ............ 296/180.1, 296/1.01, 181.1, 21; 428/31
See application file for complete search history.

(56) References Cited
U.S. PATENT DOCUMENTS

| | | | | |
|---|---|---|---|---|
| 3,298,707 A | * | 1/1967 | Gerin | 296/180.5 |
| 3,628,284 A | * | 12/1971 | Soulakis et al. | 446/462 |
| 3,914,898 A | * | 10/1975 | Ferguson | 446/470 |
| 4,965,855 A | * | 10/1990 | Tsuji | 455/344 |
| 5,061,007 A | * | 10/1991 | Simpson | 296/180.5 |
| 5,717,531 A | * | 2/1998 | Floyd | 359/838 |
| 5,924,763 A | * | 7/1999 | Daniels | 296/180.1 |
| 6,170,596 B1 | * | 1/2001 | Triarsi et al. | 180/291 |
| 6,520,829 B1 | * | 2/2003 | Temple | 446/434 |
| 6,692,062 B1 | * | 2/2004 | Woodard et al. | 296/25 |
| 6,805,399 B1 | * | 10/2004 | Brown et al. | 296/180.1 |
| 6,971,941 B2 | * | 12/2005 | Kaneko et al. | 446/269 |
| 7,175,229 B2 | * | 2/2007 | Garcia | 296/180.1 |
| 7,322,872 B2 | * | 1/2008 | Butler et al. | 446/57 |

\* cited by examiner

*Primary Examiner*—Kiran B. Patel
(74) *Attorney, Agent, or Firm*—Tod R. Nissle, P.C.

(57) ABSTRACT

A system to improve the aerodynamic stability of automobiles, comprising mounting on the roof of an automobile a scaled down replica of an existing racing vehicle including downforce generating component and in which proprietary rights exist concerning the aerodynamic construction of the racing vehicle.

1 Claim, 5 Drawing Sheets

METHOD AND APPARATUS TO IMPROVE STABILITY OF AUTOMOBILE

This invention relates to automobiles.

More particularly, the invention relates to systems to improve the aerodynamic stability of automobiles.

There are two kinds of drag, friction drag and pressure drag. Friction drag is due to air breaking or traveling over the surface of a vehicle. Pressure drag comes from the low-pressure wake that develops behind a car and exerts a force acting to pull the vehicle backwards. Friction drag is minimized by providing a smooth substantially continuous surface for air to flow over, like the surface on an airplane wing.

Downforce, or "negative lift", is an aerodynamic force that tends to press a vehicle against the ground. Some race cars generate a downforce between 1650 and 1750 pounds. Downforce is caused by air moving over a vehicle and is a force over and above the force generated by the force of gravity acting on the weight of a vehicle.

The weight of an automobile is substantial, but in many cases is not sufficient to prevent the automobile from being laterally displaced or tipped during undesirable weather conditions. This is particularly true during rain or snow, and when a vehicle has a relatively high profile.

Accordingly, it would be advantageous to provide a relatively inexpensive, simple process to improve the stability of an automobile.

Therefore, it is a principal object of the invention to provide an improved system to modify and enhance the aerodynamic efficiency of an automobile.

This and other, further and more specific objects of the invention will be apparent from the following detailed description thereof, taken in conjunction with the drawings, in which.

Figure 1:
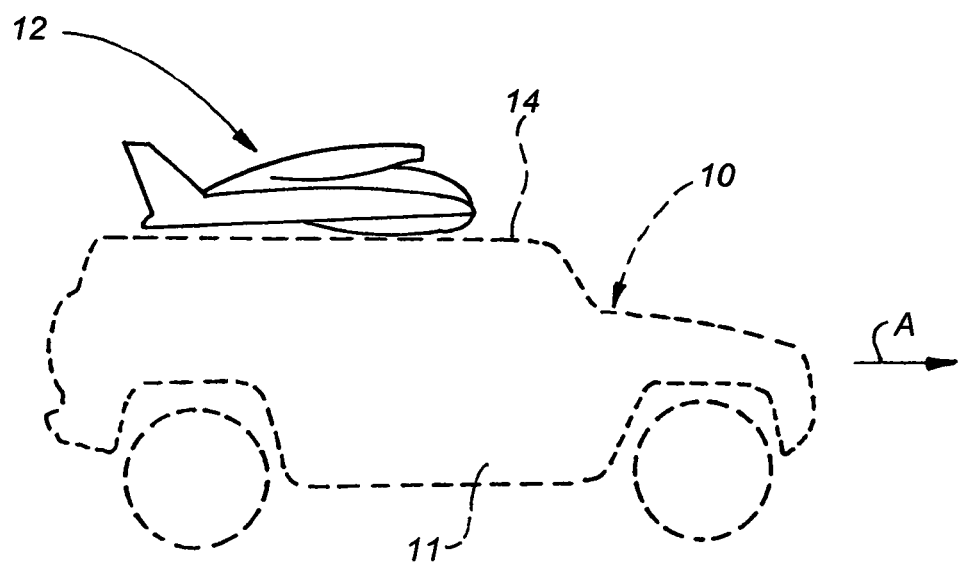
FIG. 1 is a side view illustrating an automobile adapted in accordance with the principles of the invention.

Briefly, in accordance with the invention, I provide an improved method to modify the aerodynamic stability of an automobile. The automobile has an interior, an exterior, and a roof. The improved method includes the step of selecting a pre-existing racing vehicle. The racing vehicle has an exterior with a front, a rear, a top, and a bottom. The top has an aerodynamic shape that promotes the smooth flow of air over the top. The racing vehicle includes at least one downforce component connected to one of a pair comprising the front, and rear. The downforce component produces, when the vehicle is moving forwardly through air, a downforce that acts to force the vehicle toward the ground. The racing vehicle is associated with a selected sport in which an organization conducts competitive racing events in which the vehicle competes. The racing vehicle is designed for racing and has been aerodynamically tested in a wind tunnel. The method also includes the steps of constructing a reduced-size replica of the racing vehicle including the exterior of the racing vehicle and the down force component; and, mounting the replica on the roof of the automobile such that when the automobile moves forwardly a down force is generated by air flowing over the downforce component to help stabilize the automobile, the magnitude of the downforce increasing as the speed of the automobile increases, and such that the magnitude of lift, if any, generated by air flowing over the replica is less than the magnitude of the down force. The method also includes the step of driving the automobile with the replica mounted thereon to generate the downforce.

If desired, in another embodiment of the above-described method of the invention, the racing vehicle can have at least two configurations, a first configuration in which the racing vehicle produces at a selected speed of travel a down force having a first magnitude and a drag having a second magnitude; and, a second configuration in which the racing vehicle produces at said selected speed of travel a down force having a magnitude less than said first magnitude and a drag having a magnitude less than said second magnitude. One of the two configuration is selected, and the replica is constructed utilizing the selected configuration.

In a further embodiment of the above-described method of the invention, the downforce component is adjustable between at least two operative positions to alter the magnitude of down force produced by said down force component at a selected speed of travel of said racing vehicle; one of the two operative positions is selected; and, the replica is constructed with the down force component in the selected operative position.

In another embodiment of the above-described method of the invention, the replica is mounted on the automobile to prevent substantially any air from flowing along the bottom of the replica.

In still a further embodiment of the above-described method of the invention, fields are selected on the replica to apply indicia identifying a plurality of different entities associated with conducting competitive events in the selected sport; permission is secured from each of the different entities to apply the indicia in the fields on the replica; and, the replica is constructed with the indicia applied to said fields. In one variation of this embodiment of the invention, the racing vehicle is a racing boat; the replica is of a racing boat; the competitive racing events comprise boat racing events; one of the entities is a driver that drives the racing boat in the competitive racing events; one of said entities is a sponsor of the competitive events; one of the entities is a sponsor that sells products to consumers; and, the fee for the sponsors varies depending on at least one of a pair comprising the size of the indicia and the field in which the indicia is applied. In another variation of this embodiment of the invention, the racing vehicle is a racing car; the replica is of the racing car; the competitive racing events comprise car racing events; one of said the is a driver that drives the racing car in the competitive racing events; one of the entities is a sponsor of the competitive events; one of the entities is a sponsor that sells products to consumers; and, the fee for the sponsors varies depending on at least one of a pair comprising the size of the indicia and the field in which the indicia is applied.

In still another embodiment of the above-described embodiment of the invention, the replica includes a storage compartment comprising a hollow bounded by the exterior of the racing vehicle; and, at least one selected article is stored in the storage compartment.

In yet a further embodiment of the invention, I provide an improved method to modify the aerodynamic stability of an automobile. The automobile has an interior, an exterior, and a roof. The improved method includes the step of selecting a pre-existing racing vehicle. The racing vehicle has an exterior with a front, a rear, a top, and a bottom. The top has an aerodynamic shape that promotes the smooth flow of air over the top. The racing vehicle includes at least one down force component connected to one of a pair comprising the front and the rear of the racing vehicle. The down force component produces, when the vehicle is moving forwardly through air, a downforce that acts to force the vehicle toward the ground. The racing vehicle is associated with a selected sport in which an organization conducts competitive racing events in which the vehicle competes. The improved method also includes the step of selecting fields on said replica to apply indicia identifying a plurality of different entities associated with conducting competitive events in the selected sport. One of the entities comprising a driver that drives the racing car in the competitive racing events; one of the entities comprises a sponsor of the competitive events; and, one of the entities comprising a sponsor that sells products to consumers. The improved method also includes the steps of securing for a fee permission from each of the different entities to apply the indicia in the fields on the replica, the fee for said sponsors varying depending on at least one of a pair comprising the size of the indicia and the field in which the indicia is applied. The improved method also includes the steps of constructing a reduced-size replica of the racing vehicle including the exterior of the racing vehicle, including the indicia in the selected fields, and including the down force component, the replica including a storage compartment comprising a hollow bounded by the exterior; and, mounting the replica on the roof of the automobile such that when the automobile moves forwardly a downforce is generated by air flowing over the downforce component to help stabilize the automobile, the magnitude of the downforce increasing as the speed of the automobile increases, and the magnitude of lift, if any, generated by air flowing over the replica is less than the magnitude of the down force. The improved method also includes the steps of storing at least one selected article in the storage compartment; and, driving the automobile with the replica mounted thereon to generate the down force. The racing vehicle can be a NASCAR racing car or APBA formula boat hydroplane.

Turning now to the drawings, which depict the presently preferred embodiments of the invention by way of explanation, and not limitation, of the invention, and in which like reference characters refer to corresponding elements throughout the several views, FIG. 1 illustrates a replica 12 of an APBA formula boat hydroplane mounted on an automobile 10 having an exterior 11, an interior (not shown) including a driver and passenger compartment, and a roof 14. Replica 12 is mounted on roof 14.

Figure 2:
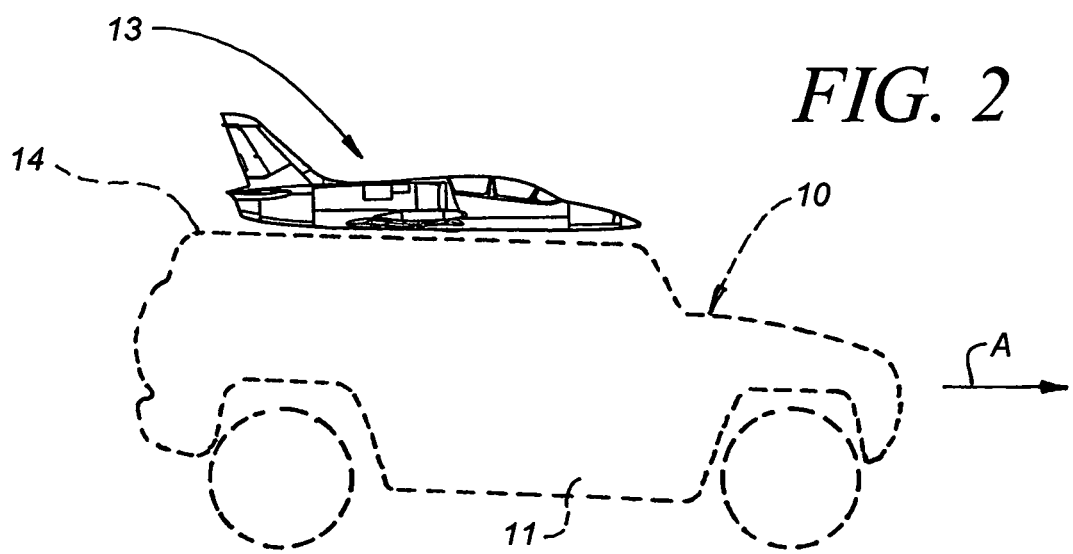
FIG. 2 is a side view illustrating an automobile adapted in accordance with the principles of the invention.

FIG. 2 illustrates a replica 13 of an airplane mounted on the roof of automobile 10.

Figure 3:
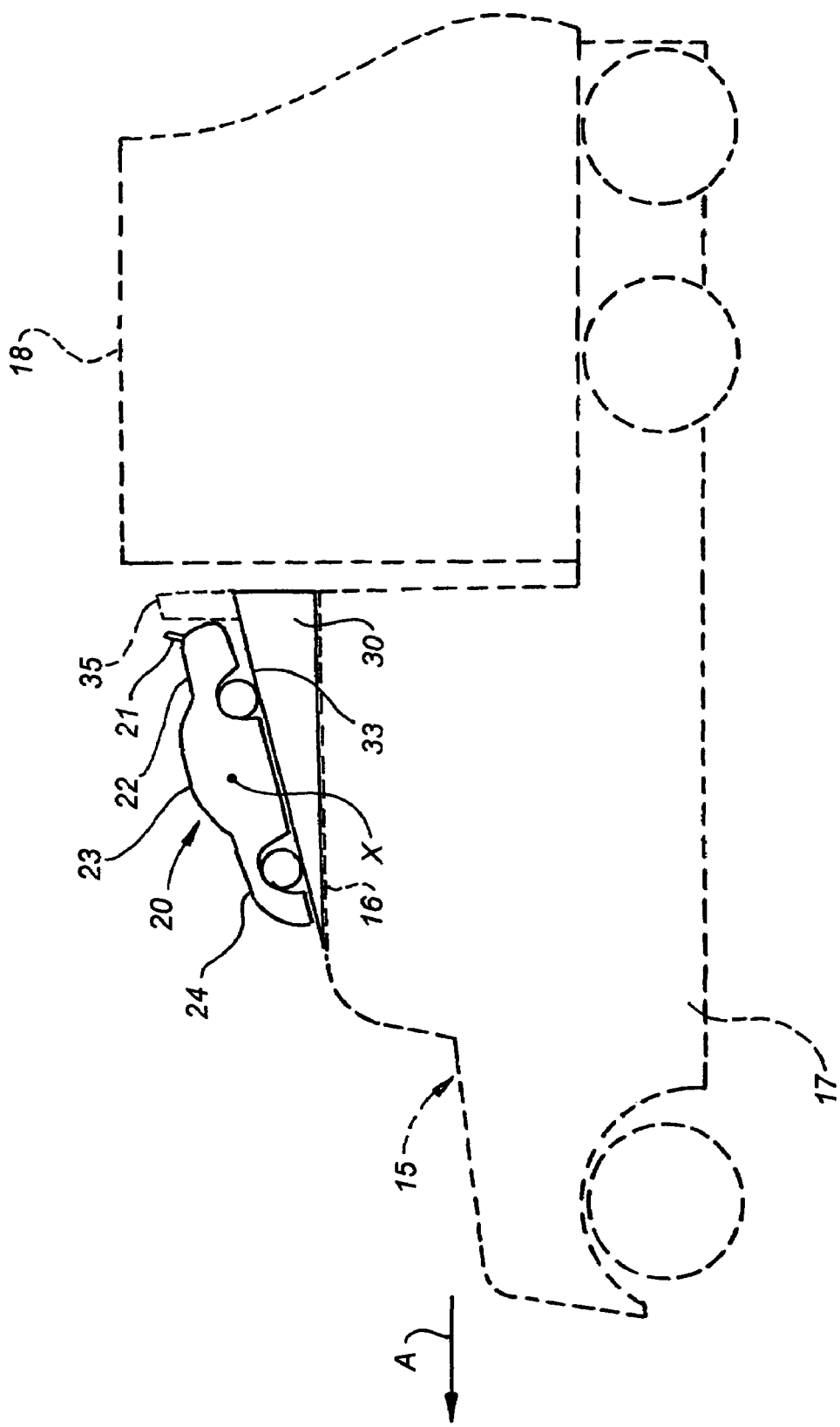
FIG. 3 is a side view illustrating a vehicle adapted in accordance with the invention.

FIG. 3 illustrates a replica 20 of a NASCAR race car mounted on the roof 16 of a truck tractor 15 having an exterior 17 and an interior (not shown) including a driver compartment. Part of the mounting system for replica 20 includes a support base 30 that is secured to roof 16 and that enables replica 20 to be mounted at an angle on sloped surface 33. Replicas 12, 13, 20 are each mounted on an automobile in the orientation in which the vehicle after which the replica is modeled would normally travel forwardly in the direction of arrow A. Similarly, automobiles 11 and 15 normally travel forwardly in the direction of arrow A.

Definition of Automobile

For purposes of simplicity, as used herein the term automobile includes motorized vehicles that people sit in and drive along roads and freeways to travel from one place to another. As such, automobiles include cars, pickup trucks, SUVs, and large truck tractors 15.

Definition of Replica

As used herein, the term replica indicates a reproduction of an object that is substantially similar to the object so that when the replica is compared to the object it is readily apparent that the replica is a copy of the object.

Replica Utilized in the Invention

The replicas utilized in the practice of the invention normally are reduced-size and, consequently, are smaller than the actual object. Further, the replicas ordinarily are not replicas of the entire object, but only of the exterior of the object. For example, in the practice of one primary embodiment of the invention, replicas of racing vehicles are utilized. While these replicas reproduce the exterior "shell" and appearance of a racing vehicle, they are not concerned with reproducing the engine, seats, steering wheel, and other interior components of the object.

Selecting Pre-Existing Vehicles

An important feature of one embodiment of the invention is the selection of pre-existing racing vehicles.

One important object of the invention is to provide a means of enhancing the aerodynamic stability of an automobile, particularly when the automobile is traveling at freeway speeds in inclement weather or across areas that experience cross winds. Racing vehicles often undergo extensive aerodynamic testing in a wind tunnel to minimize friction drag, low pressure drag and to control the downforce produced by air traveling over the vehicle. Such testing can in large part obviate the need to specially design and test aerodynamically a device in accordance with the invention.

Selecting Pre-Existing Vehicles in which Proprietary Rights Exist

Since significant expense is incurred in designing a racing vehicle and because the vehicle can become associated with certain events, drivers, or organizations, the owner(s) of the vehicle often have trademark, trade secret, or other proprietary rights in the vehicle. The existence of such proprietary rights often is indicative of the aerodynamic efficiency of the vehicle. As such, in one embodiment of the invention, racing vehicles in which proprietary rights exist are preferred over generic designs of vehicles or other objects. In the practice of the invention, such proprietary rights are particularly important in two areas, the exterior shape and dimension of the vehicle, and the indicia that are applied to the exterior of the vehicle.

The exterior shape and dimension of the racing vehicle is, as noted, important in minimizing friction drag and in adjusting downforce and drag. While a replica of a racing vehicle may not exactly duplicate the racing vehicle in every detail, it is often advantageous to closely replicate the racing vehicle in order to capture as much as possible of the aerodynamic efficiency of the vehicle.

The fact that an object may have as a proprietary right an existing patent or copyright, or have the ability of being protected under a design patent or a utility patent is not, by itself, considered an important proprietary right in the practice of the invention. The proprietary right should concern the aerodynamic configuration of the object, should concern the value of the object as a trademark or servicemark, should concern the utilization of the object in connection with competitive events in a sport, or should concern the utilization of the object in connection with indicia placed on the object to identify entities associated with use of the object. For example, wind tunnel testing data, trade secrets concerning the aerodynamic configuration of the racing vehicle, trademark indicia on the vehicle, and recognition of a racing vehicle as a trademark, service mark, or as a vehicle associated with races by a particular organization are proprietary rights that are important in the invention.

The exterior shape and dimension of the racing vehicle can be important because if it is recognizable to consumers in connection with its use in competitive events in a sport, it can facilitate the marketing of the invention. This is especially the case in long-existing sports that have relatively large fan bases, have well known organizations conducting events in the sport, and have well known drivers or driver teams. As used herein, an organization conducts an event if it sanctions the event, organizes the event, and/or controls the operation of the event. One such sport is motor boat racing. The APBA (American Power Boat Association) has existed for over 100 years and conducts power boat racing events in the United States, including events in which Formula Boat hydroplanes race. Each Formula Boat hydroplane has a driver and a supporting team and is recognizable by the indicia on the boat. Another such sport is stock car racing, in which NASCAR conducts events.

Downforce Components of Racing Vehicle

The exterior shape and dimension of the racing vehicle is also important because the vehicle typically includes downforce components like air dams, splitters, spoilers, and wings that, when air flows over the components while the vehicle is traveling forwardly in the direction of arrow A (FIGS. 1 to 5), generate a force that acts downwardly and acts to force the vehicle against the road or other surface over which the vehicle is traveling. The orientation or configuration of these downforce components can be adjusted to vary the magnitude of downforce and drag produced. Sometimes the magnitude of downforce produced is adjusted to be significantly different. For example, in stock car racing, on short tracks downforce having a relatively high magnitude is important. As a result, a race vehicle is "set up" in a first configuration that produces more downforce—even though an increase in downforce carriers with it the penalty of increased drag. On the other hand, on long "superspeedway" tracks, downforce is less important and a race vehicle is set up in a second configuration that produces less downforce and less drag. In one embodiment of the invention, a selection is made between two configurations of a race vehicle—a first configuration that produces a first selected downforce at a selected speed and a second configuration that produces a second selected downforce at a selected speed such that the second selected downforce is less than the first selected downforce. Whether the first configuration or the second configuration is selected to make the scaled down replica can depend on any desired criteria such as personal preference or the conditions under which the vehicle on which the replica is to be mounted will be driven, i.e., will the vehicle be driven under conditions in which a higher downforce is desirable or, conversely, where less downforce and less drag is desirable. If the vehicle on which the replica is mounted is driven for long stretches on relatively flat, straight freeways with little cross wind then the second configuration can be selected because less downforce is normally required. If the vehicle is driven for long stretches on winding or hilly roads or on roads that experience strong cross winds, then the first configuration can be selected because more downforce is preferred in such conditions.

In another embodiment of the invention, the replica produced includes downforce components that can be adjusted at the factory, at a retail outlet, or by a consumer or other individual that purchases the replica. For example, the replica of a race vehicle can include a wing 36 (FIG. 4) that extends laterally across the back of the race vehicle and that is pivotally mounted so that the wing can be loosened, so that the "tilt" or "cant" of the wing can be adjusted to a new position to alter the downforce produced by the wing at a selected speed of travel (i.e., when the replica and vehicle on which the replica is mounted are traveling a sixty mph or another selected speed), and so that the wing can be tightened to secure it in the new position. Or, the replica of a race vehicle can include a spoiler 21 that extends laterally across the back of the race vehicle and that is pivotally mounted so that the spoiler can be loosened, so that the "tilt" or "cant" of the spoiler can be adjusted to a new position to alter the downforce produced by the spoiler at a selected speed of travel, and so that the spoiler can be tightened to secure it in the new position. Or, the horizontally oriented splitter plate 25 that extends laterally horizontally across the front lower bumper of the race vehicle can be loosened and adjusted to a new position to alter the downforce produced by the splitter at a selected speed of travel, and so that the splitter plate can be secured in the new position.

Figure 4:
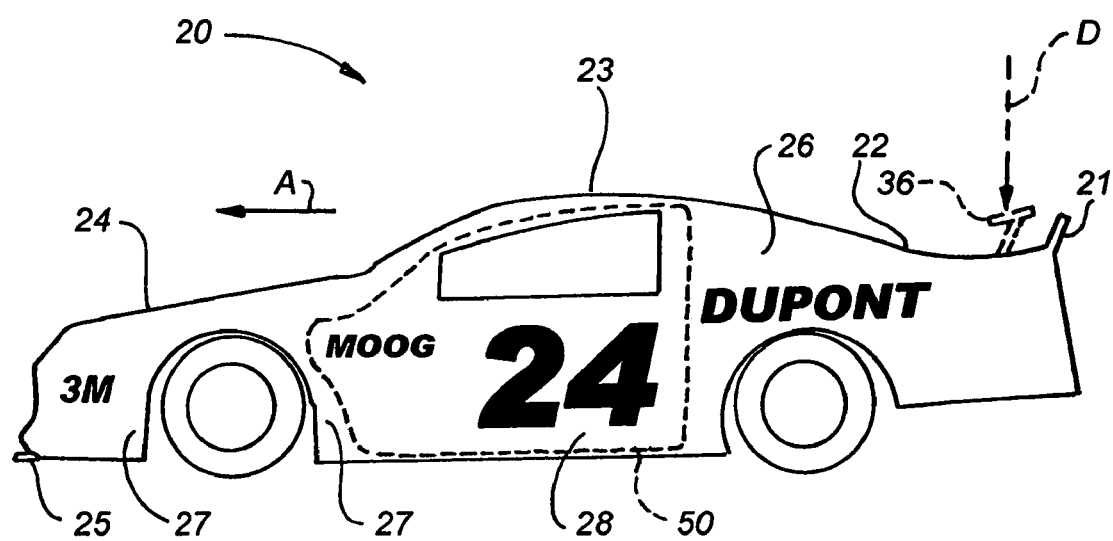
FIG. 4 is a perspective view illustrating a vehicle with indicia applied in designated fields on the vehicle.
Figure 5:
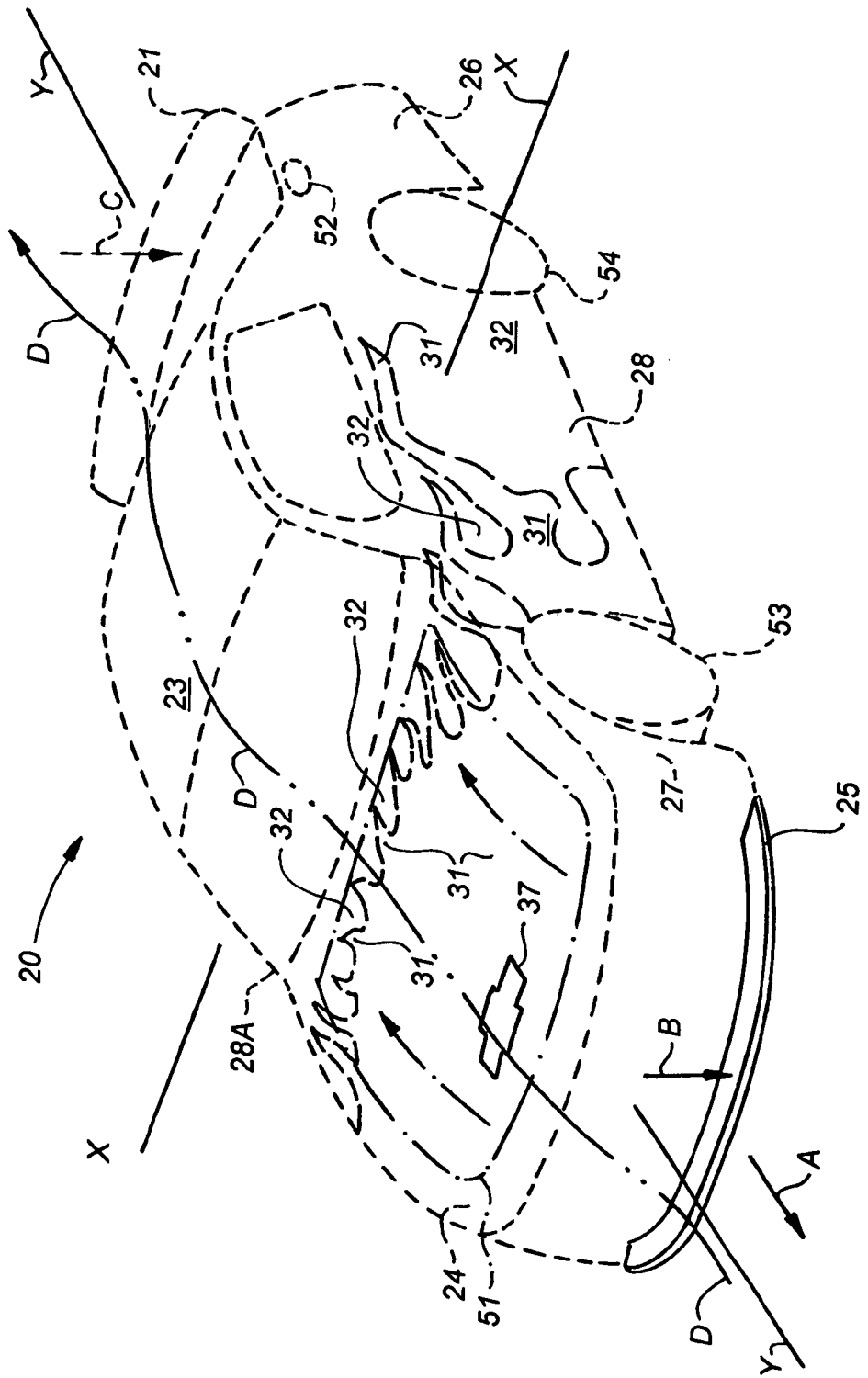
FIG. 5 is a perspective view illustrating the racing vehicle of FIGS. 3 and 4 with a design indicia painted on the vehicle to identify the driver and the driver's team; and, FIG. 6 is a block flow diagram illustrating a system of the invention.

The downforce produced by air flowing over a spoiler 21 is indicated by arrow C in FIG. 5. The downforce produced by air flowing over a wing 36 is indicated by arrow D in FIG. 4. The downforce produced by air flowing into and over a splitter, or dam, 25 is indicated by arrow B in FIG. 5. Air flowing over the down-sloped front hood 24 of a vehicle also produces a downforce acting on the vehicle.

Indicia

In one embodiment of the invention, indicia are placed on the replica. The indicia can be owned by, associated with, and/or identify various entities associated with the vehicle or with the sport in which the vehicle completes. One such entity can comprise the organization(s), like APBA, that conducts competitive events in a sport. Another such entity can comprise the driver of the vehicle. Further entities can comprise the driver's team, or a sponsor of the driver or driver's team or organization conducting the event. One such sponsor can be a company that manufactures vehicles of the general type utilized in the sport. For example, such a sponsor in connection with APBA events could comprise a boat manufacturer. Another such sponsor could manufacture items utilized in connection with vehicles of the general type utilized in the sport. For example, such a sponsor in connection with APBA events could be a company that builds boat anchors or boat navigation equipment. A further such sponsor could manufacture items that are not utilized in connection with vehicles of the general type utilized in the sport but that manufacture or sell other products to consumer. For example, such a sponsor in connection with APBA events could be a company that manufactures roofing for homes or automobile engines or baby food.

The indicia placed on the replica typically comprise trademarks, service marks, or trade names owned by one of the various entities associated with the vehicle. The indicia can also comprise numbers or paint designs that identify the driver or driver's team associated with the vehicle or other object that the replica represents.

The use on replica 20 of indicia indicating a variety of different entities permits replica 20 to serve a promotional function as well as an aerodynamic stability function.

Indicia Fields

In one embodiment of the invention, fields or areas on the exterior of a replica are defined. The cost of being a sponsor varies according to the field selected and/or according to the size of the indicia applied to a field. FIG. 4 illustrates, by way of example, and not limitation, some fields and indicia on a replica 20 of a racing car. The fields selected and guidelines for the size of indicia permitted in the fields and for the cost of having the privilege of having an indicia in a field can be comparable or can vary as desired.

In FIG. 4, one field is the left rear quarter panel 26 of replica 20. The indicium on the quarter panel 26 comprises the trademark DUPONT™. Another field comprises the side 28 of replica 20. The indicium on the side 28 comprises the number 24 that identifies the driver of the car. A further field comprises the area 27 adjacent and extending about the front left wheel well of the replica 20. The indicia in area 27 comprise 3M™ and MOOG™. Other fields that can be designated on replica 20 include the hood 24 and roof 23.

Two or more indicia can share a common field on a replica 20. In FIG. 5, one indicium comprises a paint scheme or design that extends over multiple indicia fields on replica 20. The paint scheme includes a flame design comprising areas 31 that are painted red. The paint scheme also includes areas 32 that are painted blue and that appear to be behind or beneath the flame design. The combination of the red and blue paint areas 31, 32 create an indicium that identifies the car, the driver of the car, and the driver's team.

The red and blue paint areas extend over the hood 24, over the area 27 around the front left wheel well, and over the side of the replica 20. Accordingly, the paint scheme indicium shares fields with CHEVROLET LOGO™ 37 and can share with other indicia the field extending around the front left wheel well and in the field comprising the side of the replica.

Aerodynamic Shape

In FIG. 5, the top 23 of replica 20, as well as the hood, front windshield, back windshield (not visible), and upper surface of the rear 22 of replica 20, are shaped and dimensioned to facilitate the smooth, generally uninterrupted, flow of air over replica 20 in the manner indicated by arrow D in FIG. 5. The spoiler 21 deflects air flow upwardly away from replica 20, which creates drag but also produces a significant downforce indicated by arrow C and acting on replica 20. Similarly, some of the air flowing into the front bumper area of replica 20 flows into splitter 25 to create a downforce indicated by arrow B. The front bumper area and the rear of the replica 20 can be constructed in any desired manner to produce a desired downforce magnitude or effect.

Article Carrier

In one embodiment of the invention, replica 20 includes a hollow 50 (FIG. 4) that is inside and bounded at least in part by the exterior of replica 20. FIGS. 3, 4 and 5 each depict the exterior of replica 20. The hollow 50 can function to store and transport articles such as tools, luggage, clothing, water, gasoline, oxygen or any other desired article. Any desired system utilized to access hollow 50. For example, replica 20 can be provided with a hinged "hood" that open and closes and functions as an access door into hollow 50. This hood, or door, is indicated in FIG. 5 by dashed line 51. Or, a conduit 52 can be provided for charging hollow 50 with a fluid like water. Replica 20 can, if desired, be provided with wheels 53, 54 that actually turn such that replica 20 can be rolled and moved over the ground prior to being mounted on top of an automobile. This is convenient because the replica 20 can be loaded in a home or other location and then be wheeled (or carried or otherwise transported in the event replica does not have operational wheels) to an automobile and secured on top of the automobile. In one embodiment of the invention, replica 20 stores articles utilized during a "tail gate" party at a sporting event. In another embodiment of the invention, a kit is sold to consumers. The kit includes replica 20 and tail gate articles that are stored inside replica 20 and can be utilized at a sporting event. A further embodiment of the invention comprises a kit including replica 20 and decals or other articles that can be applied to the exterior of replica 20. The decals can comprise indicia of the type described above or can comprise any other symbols, pictures, etc.

Fastening System

Screws, brackets, clips, latches or any other desired means can be utilized to secure replica 20 to the roof of an automobile. Many securing systems are known in the art and are not set forth in detail herein. It is worthy to note that the elevation of the front end of replica 20 with respect to the rear end of replica 20 can be varied, as is indicated in FIGS. 1 to 3. However, while the replica 20 can, when mounted, be rotated about lateral horizontal axis X to a nose down position in the manner illustrated in FIG. 3, the replica 20 ordinarily will not—because of the goal of aerodynamic efficiency with respect to an automobile 10 or 15—be mounted on the roof of a vehicle in an orientation in which the replica 20 has been rotated about a longitudinal axis Y (FIG. 5) such that one side 28 of the replica is high than the other side 28A, although such an orientation can, if desired, be accomplished.

Replica-Vehicle Correlation

In one embodiment of the invention, the replica and vehicle on which the replica is mounted correlate. This occurs when the racing vehicle (and replica thereof) is the same kind of vehicle as the vehicle on which the replica of the racing vehicle is mounted. Consequently, if a scaled down replica of a racing boat is mounted on a boat, then the replica, racing boat, and boat on which the replica is mounted correlate. One advantage of such a correlation is that the aerodynamic profiles of the replica and the vehicle on which the replica is mounted are similar, which usually make it simpler to integrate the replica with the vehicle on which the replica is mounted. A second advantage of such a correlation is that it is believed to make it more likely that the replica will be purchased and used by the owner of the vehicle, i.e., if the owner is interested in cars, it is more likely the owner will purchase the replica of a racing car. A third advantage of such a correlation is that when the scaled down replica is mounted on a vehicle, there is a symmetry created between the replica and vehicle that is believed to draw attention to the vehicle and to the indicia on the replica.

Method to Improve Aerodynamic Handling

Figure 6:
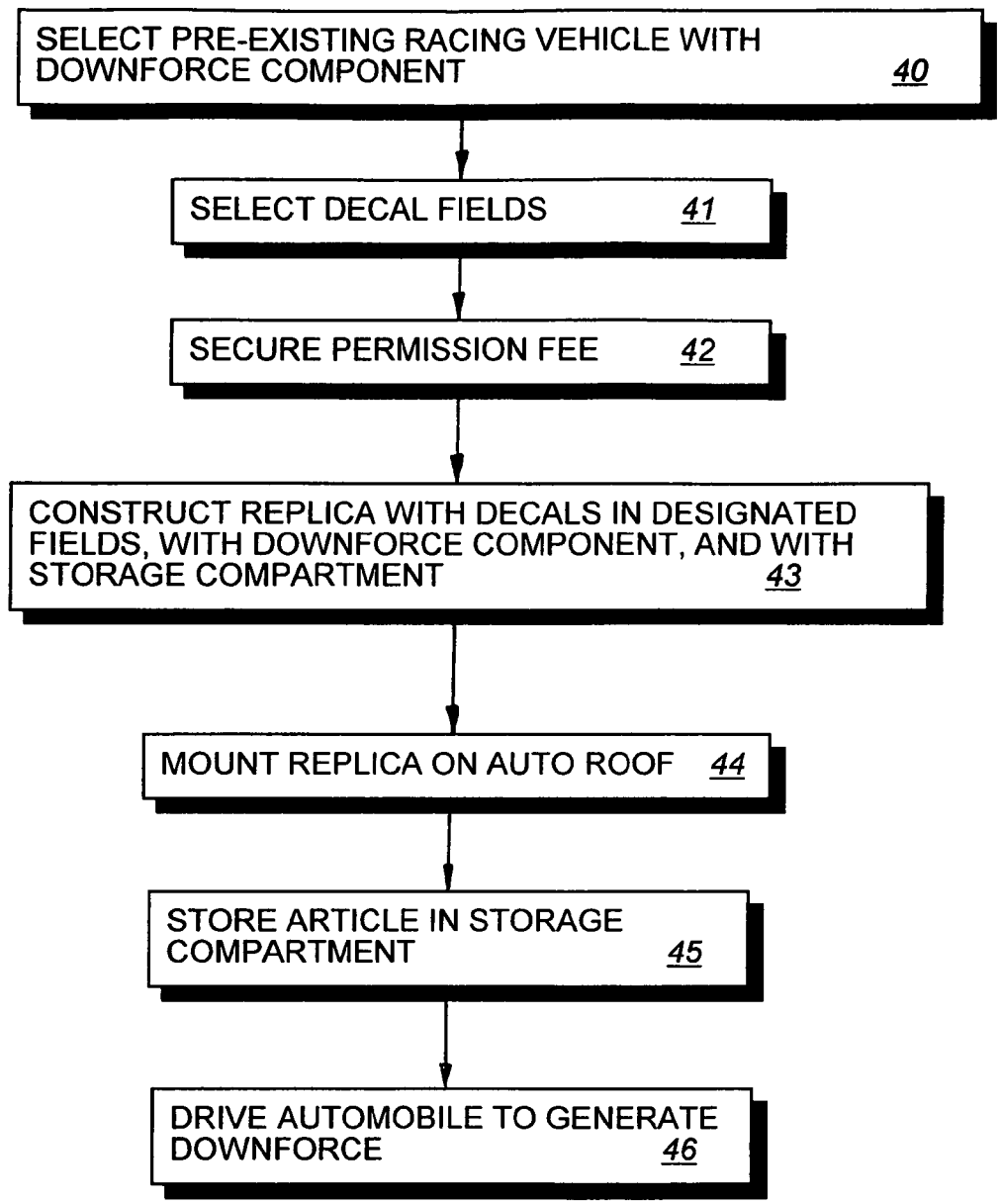

One embodiment of the invention is illustrated in FIG. 6 and includes a system including the step 40 of selecting a pre-existing racing vehicle with a downforce component. After the racing vehicle is selected, decal fields can be defined or selected 41. Permission is then secured 42 to apply to the selected fields in the form of decals, paintings, etc. trademark, service marks or other symbols or indicia owned or used by entities associated with races in which the racing vehicle participates. The fee necessary to obtain permission may be a fee paid to the entities, a fee paid by the entities (for example, from sponsors to the driver or owner of the car because use of the sponsor's marks on the replica 20 provides advertising and generates good will for the sponsors), or may be in the form of another verbal or written permission in which the fee in dollars is zero. Trademarks, service marks and other symbols owned or utilized by entities are only applied to a replica if the necessary permission is obtained and the entities elect to have such trademarks, service marks, etc. applied. After permission to utilize the marks or symbols is secured, a replica—typically a down-sized replica—of the racing vehicle is constructed including—at selected positions in the defined fields—decals, paintings, or other representations of the trademarks, service marks, or other symbols of the participating entities. The replica preferably, but not necessarily, includes at least one downforce component, and can also include, if desired, a hollow accessible storage area. The replica ordinarily only reproduces the exterior appearance of the racing vehicle and does not replicate inner components like the engine, passenger seats, etc., although such can be included if desirable. After the replica 20 is constructed it is sold or otherwise provided to a consumer or other end user. The consumer mounts 44 the replica 20 on the roof of an automobile. Prior to mounting the replica 20, the consumer can, if desired, place articles in the storage area and then transport the replica 20 to the automobile to be mounted. Or, the consumer can place 45 articles in the storage compartment after the replica 20 is mounted on the roof of a vehicle. After the replica 20 is secured to the roof of an automobile, the automobile is driven 46 to permit the replica 20 to generate a downforce that assists the automobile in maintaining contact with the road during inclement or windy weather.

Having described the presently preferred embodiments and best mode of the invention in such terms as to enable those of skill in the art to understand and practice the invention, I claim:

1. A method to modify the aerodynamic stability of an automobile having an interior, an exterior, and a roof comprising the steps of
   (a) selecting a racing vehicle in which proprietary rights exist comprising a group of rights consisting of
      at least one trademark or service mark,
      wind tunnel testing data,
      trade secrets concerning the aerodynamic configuring of said vehicle, and at least one indicium identifying the driver of said vehicle,
      said racing vehicle
      (i) having an exterior with a front, a rear, a top, and a bottom, said top having an aerodynamic shape that promotes the smooth flow of air over said top,
      (ii) including at least one down force component connected to one of a pair comprising
         said front, and
         said rear
         said down force component producing, when the vehicle is moving forwardly through air, a down force that acts to force the vehicle toward the ground, and
      (iii) associated with a selected sport in which an organization conducts competitive racing events in which said vehicle competes;
   (b) selecting fields on said replica to apply indicia identifying a plurality of different entities associated with conducting competitive events in said selected sport;
      (i) one of said entities comprising a driver that drives said racing car in said competitive racing events;
      (ii) one of said entities comprising a sponsor of said competitive events;
      (iii) one of said entities comprising a sponsor that sells products to consumers;
   (c) securing for a fee permission from each of said different entities to apply said indicia in said fields on said replica, said fee for said sponsors varying depending on at least one of a pair comprising the size of the indicia and said field in which said indicia is applied;
   (d) constructing a reduced-size replica of said racing vehicle including said exterior of said racing vehicle, said indicia in said selected fields, and said down force component, said replica including a storage compartment comprising a hollow bounded by said exterior;
   (e) mounting said replica on the roof of the automobile such that when the automobile moves forwardly
      (i) a down force is generated by air flowing over said down force component of said replica to help stabilize the automobile, the magnitude of said down force increasing as the speed of the automobile increases, and
      (ii) the magnitude of lift, if any, generated by air flowing over the replica is less than the magnitude of said down force;
   (f) storing at least one selected article in said storage compartment; and,
   (g) driving the automobile with said replica mounted thereon to generate said down force.

* * * * *